US011949197B2

(12) United States Patent
Sutter

(10) Patent No.: US 11,949,197 B2
(45) Date of Patent: Apr. 2, 2024

(54) METHODS AND SYSTEMS FOR JOINING WORKPIECES

(71) Applicant: IDEAL Industries, Inc., Sycamore, IL (US)

(72) Inventor: Robert William Sutter, DeKalb, IL (US)

(73) Assignee: IDEAL Industries, Inc., Sycamore, IL (US)

(*) Notice: Subject to any disclaimer, the term of this patent is extended or adjusted under 35 U.S.C. 154(b) by 446 days.

(21) Appl. No.: 17/201,414

(22) Filed: Mar. 15, 2021

(65) Prior Publication Data
US 2022/0294169 A1 Sep. 15, 2022

(51) Int. Cl.
B32B 41/00 (2006.01)
B29C 65/06 (2006.01)
B29C 65/08 (2006.01)
H01R 43/02 (2006.01)
H01R 43/24 (2006.01)
B29L 31/36 (2006.01)

(52) U.S. Cl.
CPC ..... *H01R 43/0207* (2013.01); *B29C 65/0672* (2013.01); *B29C 65/08* (2013.01); *H01R 43/24* (2013.01); *B29L 2031/36* (2013.01)

(58) Field of Classification Search
CPC ...... H01R 43/0207; H01R 43/24; H01R 4/22; H01R 43/18; B29C 65/0672; B29C 65/08; B29C 65/06; B29C 66/0222; B29C 66/024; B29C 66/1122; B29C 66/532; B29C 66/54; B29C 66/7392; B29C 66/73921; B29C 66/742; B29L 2031/36; B29L 2031/3481

USPC .................. 156/60, 64, 350, 351, 378, 379
See application file for complete search history.

(56) References Cited

U.S. PATENT DOCUMENTS 5,846,377 A 12/1998 Frantz et al.
5,855,706 A 1/1999 Grewell
(Continued)

FOREIGN PATENT DOCUMENTS

TW 200948520 A 12/2009
WO 03082548 A1 10/2003

OTHER PUBLICATIONS

ISA/US, Int. Search Report and Written Opinion issued on PCT application No. PCT/US22/18901, dated Jun. 8, 2022, 8 pages.
(Continued)

*Primary Examiner* — Michael N Orlando
*Assistant Examiner* — Joshel Rivera
(74) *Attorney, Agent, or Firm* — Greenberg Traurig, LLP

(57) ABSTRACT

A method for joining two workpiece parts during a manufacturing process includes forming a first workpiece part having a first mating surface and forming a second workpiece part having a second mating surface. The first and second workpiece part may be separately distributed or may be joined for distribution. To join the parts, an energy director is formed in the first mating surface by an automated process, the energy director comprising an end portion projecting from the first mating surface such that the projecting end portion of the energy director engages the second mating surface when the first and second workpiece parts are brought into engagement with each other. In one example, the first and second workpiece parts are ultrasonically welded by pressing the parts together while vibrating at least one of the first workpiece part or the second workpiece part.

19 Claims, 4 Drawing Sheets

(56) References Cited

U.S. PATENT DOCUMENTS 6,017,238 A * 1/2000 Johnston .............. H01R 13/504
439/404
2015/0129110 A1 5/2015 Klinstein et al.

OTHER PUBLICATIONS

Examination Report from TW application No. 111108198, dated Oct. 12, 2022, 26 pp.

* cited by examiner

METHODS AND SYSTEMS FOR JOINING WORKPIECES

FIELD OF THE DISCLOSURE

The present description relates generally to the joining of two workpieces with mating surfaces to form an integrated article and more particularly to methods and systems for joining workpieces via welding.

BACKGROUND OF RELATED ART

Welding, such as ultrasonic welding has long been used to join two workpieces, such as thermoplastic pieces, together to form an integrated article. It is known that "energy directors" have been used to improve some welding efficiencies. These prior art energy directors typically have a single peak, to focus the ultrasonic energy at the apex, resulting in a rapid buildup of heat. This causes the triangular peak section to melt and flow across the joint interface, forming a weld.

Energy directors are oftentimes necessary prerequisites for reliable formation of integrated workpieces by ultrasonic welding and other joining techniques. Typically, an energy director is integrally molded into the mating surface of at least one of the workpieces to be joined and as noted above, the energy director is usually destroyed by melting during the welding process.

For instance, US Patent Publication No. 2015/0129110 describes an ultrasonic welding system and method for joining first and second thermoplastic parts including at least one energy director formed on at least one surface of the first thermoplastic part, with the energy director projecting from the surface of the first thermoplastic part toward an opposed surface of the second thermoplastic part. In this example, the distal end portion of the energy director has a curved or flat surface that initially engages the opposed surface of the second thermoplastic part when the first and second parts are brought into engagement with each other. The first and second thermoplastic parts are ultrasonically welded by pressing the parts together while vibrating at least the first part in a direction parallel to the direction of projection of the energy director.

While the use of energy directors for welding may be sufficient for its intended purpose, there is an identifiable need for improvements to the process of forming workpiece suitable for joining as disclosed herein.

DETAILED DESCRIPTION

The following description of example methods and apparatus is not intended to limit the scope of the description to the precise form or forms detailed herein. Instead the following description is intended to be illustrative so that others may follow its teachings.

Some products are manufactured and sold as a completely assembled, integrally formed article. For example, in some instances, two individually manufactured workpieces, such as electrical housings, may be joined such as by welded together. For instance, the workpieces may be joined by ultrasonic welding, vibration welding, spin welding, or other suitable welding and/or joining process, to form a completed article, such as an electrical connector. As is known to one of ordinary skill in the art, energy directors are oftentimes integrally molded into at least one mating surface of two workpieces intending to be joined together during manufacture of the original workpieces.

Figure 1:
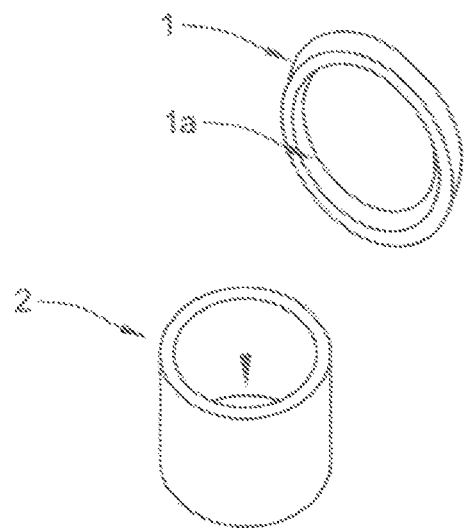
FIG. 1 is a prior art article including two separate workpiece and an integrally molded energy director.
Figure 2:
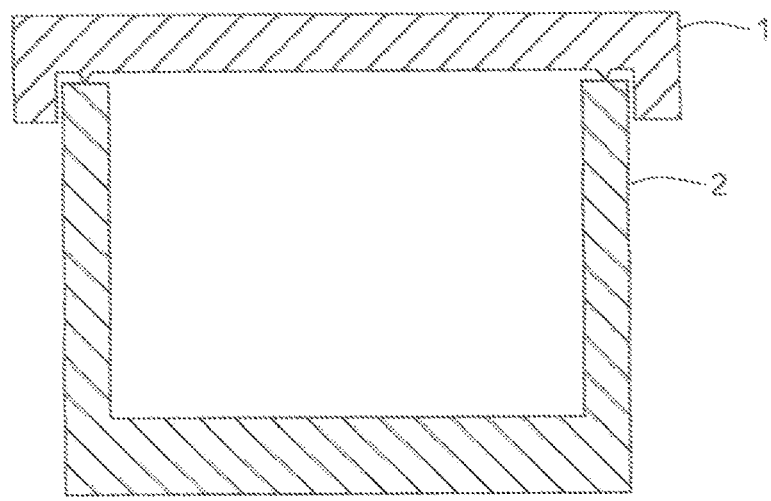
FIG. 2 is a cross section of the prior art article of FIG. 1 prior to ultrasonic welding.

Referring to FIG. 1, a prior art article includes two separate parts prior to joining via ultrasonic welding. FIG. 2 is a cross section of the prior art parts of FIG. 1. A first part 1 contains an energy director 1a integrally molded with the first part 1, while a second part 2 contains a flat mating surface. The tip of the energy director 1a is either sharp or slightly radiused, so as to provide a small contact area between the parts 1, 2, allowing an applied ultrasonic vibration to be focused during welding to initiate melting. It will be appreciated by one of ordinary skill in the art that the energy director 1a is not separately removable from the first part 1 and that for the first part 1 to be formed without the energy director 1a, the energy director 1a would either have to be physically removed or the first part 1 would have to be molded with a different mold that does not include the energy director 1a.

Returning to the present invention, there are instances, however, when it is desirable for a manufacturer to not add any energy director features to either of the original workpieces, such as when the resultant product will be sold in both a "welded" and "un-welded" configuration. In other words, in some instances, the final product will be integrally welded, requiring the use of an energy director, but in other instances, the exact same product will remain as separate workpieces, requiring an absence of an energy director. In this hybrid product configuration, a manufacturer may not want to add energy directors to the product workpieces automatically during the manufacturing process because some of the product will be sold "un-welded" and the manufacturer may not want the non-utilized energy directors to be present on the unwelded product.

The present disclosure provides a solution to a desire to manufacture a set of workpieces that can be welded into a single product or remain in an unwelded configuration, all while being manufacturable in a single workpiece mold for either final configuration.

Figure 3:
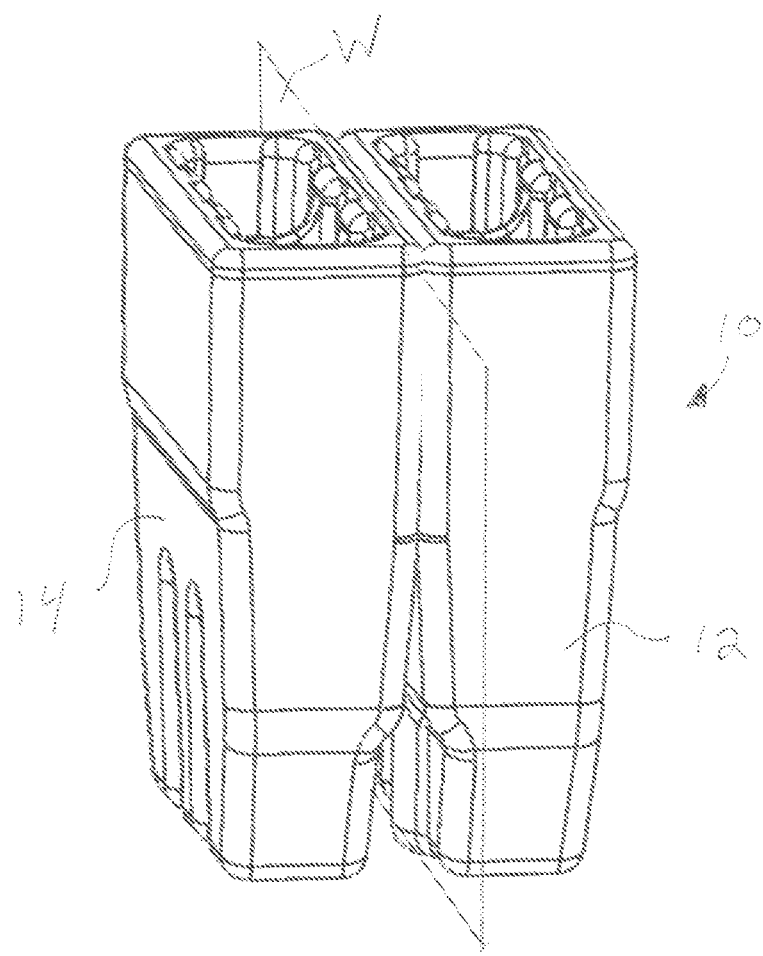
FIG. 3 is an example connector manufactured in accordance with the present invention and including a first and second workpiece joined together.

Referring now to FIG. 3, an example connector 10 is illustrated. The example connector 10 includes a first workpiece 12 and a second workpiece 14. In this instance, the example connector 10 is an electrical connector and comprises the first workpiece 12 in the form of an electrical connector having a thermoplastic housing and an enclosed electrical terminal, and the corresponding second workpiece 14 also in the form of an electrical connector having a thermoplastic housing and an enclosed electrical terminal. In one example, the first workpiece 12 and the second workpiece 14 are non-conductive.

In the illustrated example of FIG. 3, the connector 10 is finally formed by joining the first workpiece 12 with the second workpiece 14 along a weld plane W which is located between two mating surfaces, via any suitable joining process, including ultrasonically welding as will be described.

As noted, in some example, the example connector 10 may be finally constructed without joining two workpieces, i.e., in a "unwelded" configuration, wherein the first workpiece 12 and the second workpiece 14 are not welded along the weld plane W by avoiding the following manufacturing steps.

Figure 4:
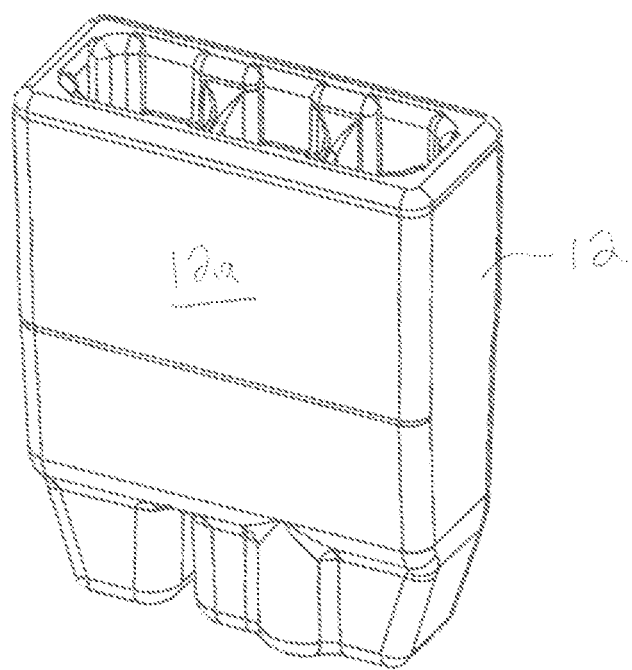
FIG. 4 is a perspective view of a single workpiece prior to joining.
Figure 6:
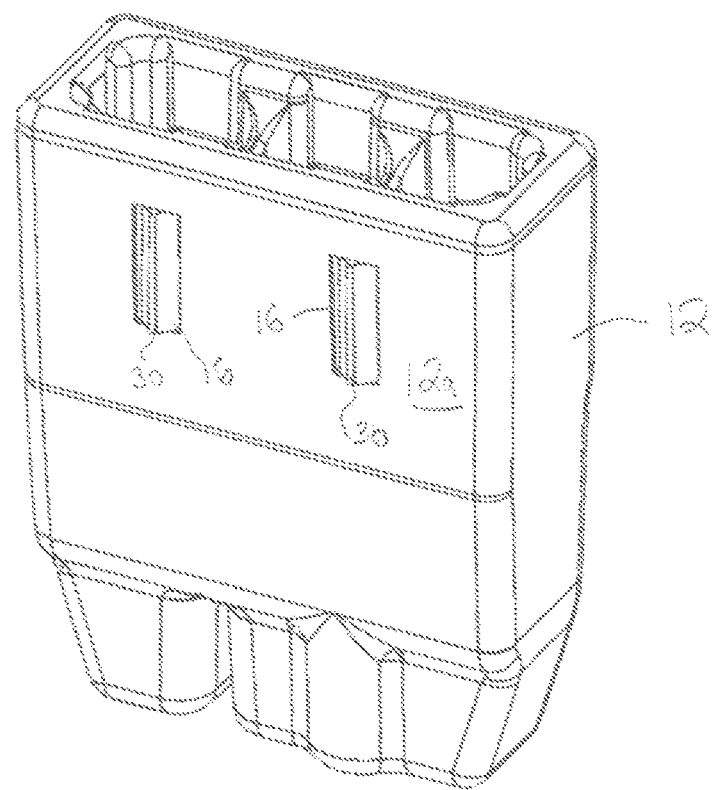
FIG. 6 is a perspective view of the workpiece of FIG. 4 showing the workpiece after creation of the energy director.

FIG. 4 illustrates a perspective view of one of the two workpieces, namely the first workpiece 12. In this example, the first workpiece 12 provides a first mating surface 12*a*, while the second workpiece 14 provides a second mating surface 14*a* (see FIG. 7) that corresponds to the first mating surface 12*a*. While the first workpiece 12 may be commercially suitable, in order to join the first workpiece 12 with the second workpiece 14, at least one energy director 16 (two are illustrated in FIGS. 6 and 7) may be formed on the first mating surface 12*a* of the first workpiece 12.

Figure 5:
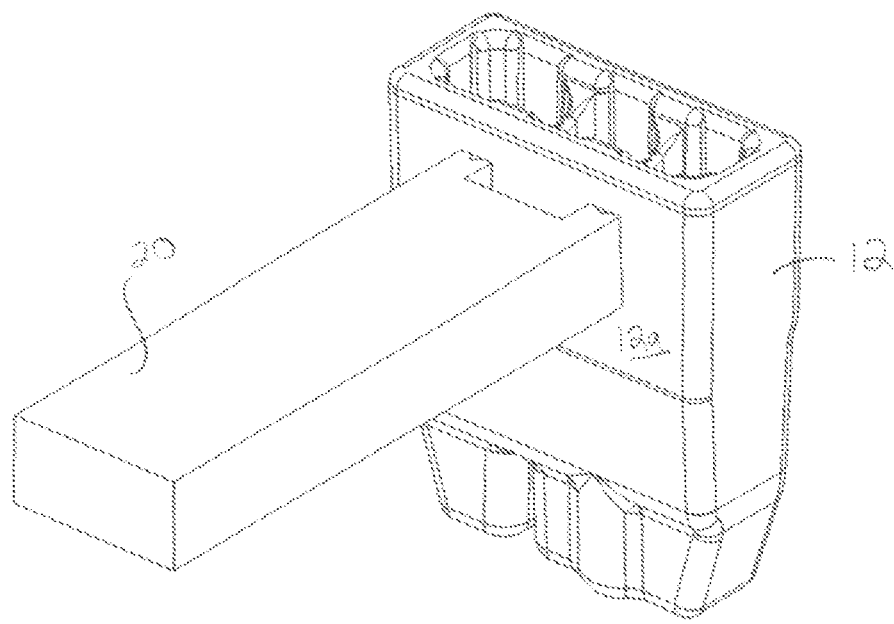
FIG. 5 is a perspective view of the workpiece of FIG. 4 showing deformation with a tool to create an energy director.

More precisely, referring to FIG. 5, the energy director 16 is formed via any suitable technique, including ultrasonic staking, sonic deformation, thermal deformation, cold forming, vibration deformation, spin friction deformation, or other suitable construction technique. In at least one example, the energy director 16 is formed via an automated technique during the manufacturing process. In the example illustrated in FIG. 5, the energy director 16 (hidden from view) is formed from an automated tool 20 which is configured to deform the first mating surface 12*a* of the first workpiece 12. As shown in FIG. 6, after removal of the tool 20, the energy director 16 comprises an end portion 30 projecting outward from the first mating surface 12*a* such that the projecting end portion 30 of the energy director 16 engages the second mating surface 14*a* first when the first workpiece 12 and the second workpiece 14 are brought together.

Figure 7:
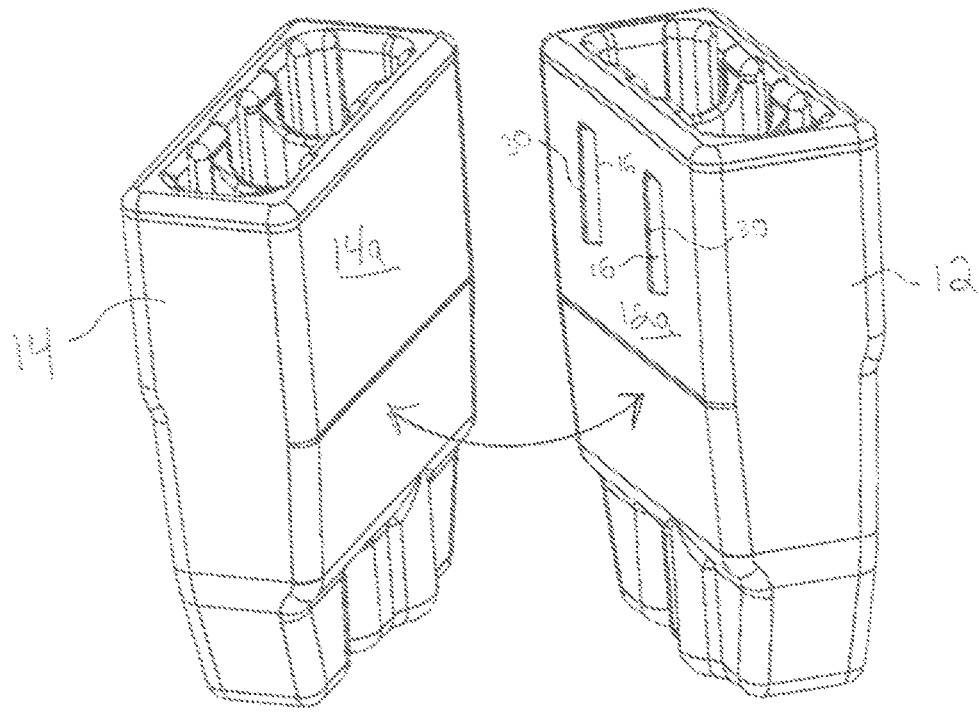
FIG. 7 is a perspective view showing the workpiece of FIG. 4 being mated to another workpiece for joining.

After forming the energy director 16 on the first mating surface 12*a*, as illustrated in FIG. 7, the first workpiece 12 and the second workpiece 14 may then be brought together and joined by any suitable joining process. For example, the two workpieces may be joined by ultrasonically welded and pressing the workpieces together while vibrating at least one of the first workpiece 12 or the second workpiece 14 as is known in the art to form the example connector 10 previously illustrated in FIG. 3. It will be appreciated by one of ordinary skill in the art that as previously disclosed, any suitable joining process may be utilized, including for instance, vibration welding, ultrasonic welding, spin welding, etc.

As disclosed, however, it will be understood by one of ordinary skill in the art that in an alternative arrangement, the final commercial product may comprise either or both of the first workpiece 12 and the second workpiece 14 without joining the two workpieces, thus, the process of forming and utilizing the energy director 16 may be avoided.

In the example disclosed, each of the first workpiece 12 and the second workpiece 14 are thermoplastic workpieces. In other examples, however, either of the first workpiece 12 or the second workpiece 14 may be other materials, including dissimilar materials such as metal, plastic, or other suitable material as desired. Additionally, one or both of the first mating surface 12*a* or the second mating surface 14*a* may include other features, such as an aperture, slot, through hole, or other structure to further facilitate the formation of the energy director 16, or to facilitate the joining of the two workpieces as desired.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

I claim:

1. A method for joining two workpieces during a manufacturing process comprising:
   forming a first workpiece comprising a first mating surface;
   forming a second workpiece comprising a second mating surface;
   after forming the first workpiece, selectively forming an energy director on the first mating surface via a separate, automated manufacturing process, the energy director comprising an end portion projecting from the first mating surface such that the projecting end portion of the energy director engages the second mating surface when the first workpiece and the second workpiece are brought together; and
   if provided with the energy director, joining the first workpiece and the second workpiece by a joining process.

2. The method for joining as recited in claim 1, wherein the joining process is an ultrasonic welding process comprising pressing the first workpiece and the second workpiece together while vibrating at least one of the first workpiece or the second workpiece.

3. The method for joining as recited in claim 1, wherein the joining process is at least one of an ultrasonic welding process, a vibration welding process, or a spin welding process.

4. The method for joining as recited in claim 1, wherein at least one of the first workpiece or the second workpiece comprises a thermoplastic.

5. The method for joining as recited in claim 1, wherein forming the energy director via the automated manufacturing process comprises at least one of ultrasonic staking, sonic deformation, thermal deformation, vibration deformation, spin friction deformation, or cold forming, to form the energy director on the first mating surface.

6. The method for joining as recited in claim 1, wherein at least one of the first workpiece or the second workpiece is a housing for an electrical connector.

7. The method for joining as recited in claim 1, wherein the first workpiece and the second workpiece are molded.

8. The method for joining as recited in claim 5, wherein the energy director is separately formed in the first workpiece via the automated manufacturing process.

9. An electrical connector comprising:
   a first workpiece comprising a first mating surface;
   a second workpiece comprising a second mating surface to cooperatively mate with the first mating surface; and
   an energy director optionally formed in the first mating surface during a separate, post molding, automated manufacturing process, the energy director comprising an end portion projecting from the first mating surface such that the projecting end portion of the energy director engages the second mating surface when the first workpiece and the second workpiece are brought into engagement with each other,
   wherein when the energy director is formed in the first mating surface, the first workpiece and the second workpiece are configured to be joined by pressing the first mating surface and the energy director towards the second mating surface, while heating at least one of the first workpiece or the second workpiece.

10. The electrical connector of claim 9, wherein joining the first workpiece and the second workpiece comprises at least one of ultrasonic welding, vibration welding, or spin welding.

11. The electrical connector of claim 9, wherein at least one of the first workpiece or the second workpiece comprises a thermoplastic.

12. The electrical connector of claim 9, wherein forming the energy director during the automated manufacturing process comprises at least one of ultrasonic staking, sonic deformation, thermal deformation, vibration deformation, spin friction deformation, or cold forming the energy director on the first mating surface.

13. The electrical connector of claim 9, wherein at least one of the first workpiece or the second workpiece is a housing comprising an electrical terminal.

14. The electrical connector of claim 13, wherein the housing is non-conductive.

15. A method for joining two workpieces comprising:
   molding a first workpiece comprising a first mating surface;
   molding a second workpiece comprising a second mating surface;
   after molding the first workpiece, selectively forming an energy director on the first mating surface via a separate, automated forming process, the energy director comprising an end portion projecting from the first mating surface such that the projecting end portion of the energy director engages the second mating surface when the first workpiece and the second workpiece are brought into engagement with each other; and
   joining the first workpiece and the second workpiece via a joining means.

16. A method as recited in claim 15, wherein the joining means comprises pressing the first workpiece and the second workpiece together while vibrating at least one of the first workpiece or the second workpiece.

17. The method as recited in claim 15, wherein at least one of the first workpiece or the second workpiece comprises a thermoplastic.

18. The method as recited in claim 15, wherein the automated forming means comprises at least one of ultrasonic staking, sonic deformation, thermal deformation, vibration deformation, spin friction deformation, or cold forming.

19. The method as recited in claim 15, wherein at least one of the first workpiece or the second workpiece is a non-conductive housing.

* * * * *